United States Patent
Ferrante et al.

(10) Patent No.: US 6,595,673 B1
(45) Date of Patent: Jul. 22, 2003

(54) COUPLING OF HIGH INTENSITY LIGHT INTO LOW MELTING POINT FIBER OPTICS USING POLYGONAL HOMOGENIZERS

(75) Inventors: Ronald A. Ferrante, Castaic, CA (US); Kenneth K. Li, Arcadia, CA (US)

(73) Assignee: Cogent Light Technologies, Inc., Santa Clarita, CA (US)

( * ) Notice: Subject to any disclaimer, the term of this patent is extended or adjusted under 35 U.S.C. 154(b) by 0 days.

(21) Appl. No.: 09/468,410

(22) Filed: Dec. 20, 1999

(51) Int. Cl.[7] .............................. F21V 7/04; F21V 11/00
(52) U.S. Cl. ........................................ 362/551; 362/558
(58) Field of Search ................................ 362/551, 558, 362/582, 560; 385/31, 39, 146; 359/96.18

(56) References Cited

U.S. PATENT DOCUMENTS

| | | | |
|---|---|---|---|
| 4,119,362 A | * | 10/1978 | Holzman ................. 350/96.18 |
| 4,757,431 A | | 7/1988 | Cross et al. |
| 4,958,263 A | * | 9/1990 | Davenport et al. ............ 362/32 |
| 5,224,200 A | * | 6/1993 | Rasmussen et al. ......... 385/146 |
| 5,341,445 A | * | 8/1994 | Davenport et al. ............ 385/39 |
| 5,430,634 A | * | 7/1995 | Baker et al. ................... 362/32 |
| 5,615,008 A | * | 3/1997 | Stachelek .................... 356/301 |
| 5,761,356 A | | 6/1998 | Li |
| 5,898,802 A | * | 4/1999 | Chen et al. .................... 385/31 |
| 6,272,269 B1 | * | 8/2001 | Naum ......................... 362/551 |

* cited by examiner

Primary Examiner—Sandra O'Shea
Assistant Examiner—Bao Truong
(74) Attorney, Agent, or Firm—Rothwell, Figg, Ernst & Manbeck, p.c.

(57) ABSTRACT

A fiber optic illumination system with increased power handling capabilities for low melting point fiber optics uses an optical homogenizer. Homogenizers of the present invention preferably comprise a rod with polygonal cross-section. The output intensity of the optical homogenizer is substantially uniform such that the output fiber optic will not be damaged by hot spots created by non-uniform intensity light.

39 Claims, 15 Drawing Sheets

COUPLING OF HIGH INTENSITY LIGHT INTO LOW MELTING POINT FIBER OPTICS USING POLYGONAL HOMOGENIZERS

NATURE OF THE INVENTION

The invention relates to fiber optic systems. Particularly, the invention provides a method and apparatus for coupling high intensity light into a low melting point optical fiber using a homogenizer to provide a more uniform intensity distribution.

BACKGROUND OF THE INVENTION

In the field of fiber optic illumination systems, it is known that optical power output from arc lamps, such as xenon lamps and metal halide lamps, can reach hundreds of watts. The fiber optic that transmits light from these light sources to the applications consists of single fibers or fiber bundles which can be made out of quartz, glass, or plastic. Plastic fibers intrinsically cannot operate at high temperature. While single glass and quartz fibers can operate at relatively higher temperatures, fiber bundles containing such fibers are still temperature sensitive due to the epoxy in between the individual fibers.

Light emitted from the arc lamp is usually coupled to a fiber optic by the use of mirrors and lenses either alone or in combination. To preserve the brightness of the arc as much as possible, an optimized optical system will produce an image of the arc on the fiber optic with as small a spot as possible and constant magnification. Due to the intrinsic nature of the arc itself, the intensity is non-uniform, as a result, the image of the arc at the fiber optic will also be non-uniform, thus producing "hot spots." These hot spots may produce intensities higher than the material damage threshold of a particular fiber optic at a localized spot before the average intensity across the fiber reaches such value. This causes substantial damage to the fiber optic. Therefore, the total power which can be delivered through the fiber optic for a non-uniform image is necessarily less than that for a uniform image. Thus, it is desirable to have an input intensity profile as uniform as possible such that the overall power can be increased before the damage threshold is reached at any single point. This will allow more light to be coupled into the fiber optic without damage.

Several methods have been used to couple more power into low melting point fibers. U.S. Pat. No. 5,898,802, the specification of which is herein incorporated by reference, discloses a method of using fused bundles to spread the intensity profile of light beam, thus reducing the peak intensity and allowing more light to be coupled into the polymer fiber. Although the use of the fused bundle spreads the intensity profile, it has a limit and does not totally produce a flat profile. U.S. Pat. No. 5,761,356 discloses the use of a spatial filter to filter out any unguided mode in the input beam to the output of a low melting point fiber. While this approach reduces the dissipation of heat from unguided modes at the input end of the fiber, the profile of the light is still non-uniform, and thus does not produce optimum results.

It is therefore an object of the present invention to provide a method and apparatus for providing a uniform intensity profile light beam to an optical fiber.

Further, it is an object of the present invention to provide a method and apparatus for providing efficiently coupling high intensity light into low melting point optical fibers.

SUMMARY OF THE INVENTION

The present invention provides a method and apparatus for coupling high intensity light into a low melting point optical fiber using a homogenizer which is a section of an optical waveguide with a polygonal cross-section. The homogenizer allows a low melting point fiber to be positioned away from the focus of the coupling system, and simultaneously provides a mixing mechanism in which the non-uniform intensity profile of the input light will become substantially uniform at the output. This allows more light to be coupled into the fiber optic before any portion of the fiber reaches the damage threshold. Preferably, the homogenizer is a section of an optical waveguide having at least a partial polygonal cross-section.

DETAILED DESCRIPTION OF THE INVENTION

Figure 1:
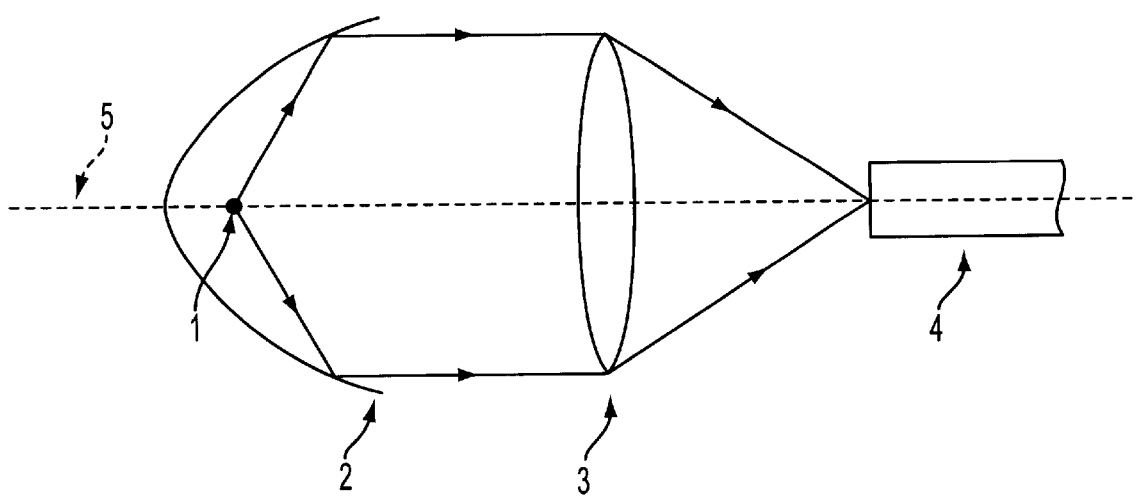
FIG. 1 is a schematic diagram of a prior art fiber optic illuminator having a parabolic reflector.

The internal components of a common fiber optic illuminator known in the art are shown in FIG. 1. It comprises an arc lamp 1, a parabolic reflector 2, a focusing lens 3, and an output fiber optic 4. Depending on the applications, the lamp can be of a variety of types, including xenon arc lamps, metal halide arc lamps, or halogen lamps. The emission area of the lamp is placed at the focus of the parabolic reflector 2, which is located along the reflector's optical axis 5. The output of the lamp is then collected by the parabolic reflector 2 and directed in parallel rays toward the lens 3. The parabolic reflector can be coated to preferentially reflect certain wavelengths. For example, for visible applications, a cold coating is used in which the UV and infrared radiation are transmitted and not reflected such that only the visible portion of the spectrum is directed towards the output. The parallel beam output from the reflector 2 is then focused to a smaller spot by the focusing lens 3 onto the end of the output fiber optic 4.

Figure 2:
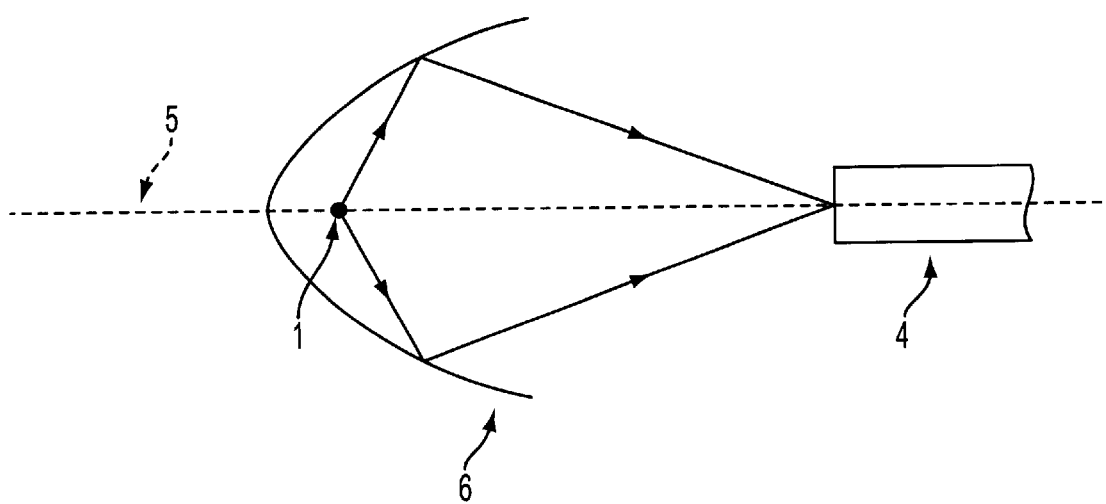
FIG. 2 is a schematic diagram of a prior art fiber optic illuminator having an elliptical reflector.

FIG. 2 shows another configuration of such an illuminator using an elliptical reflector 6. The emission area of the lamp 1 is placed at one focus of the reflector 6 and the output fiber optic 4 is placed at the other focus of the reflector 6.

Figure 3:
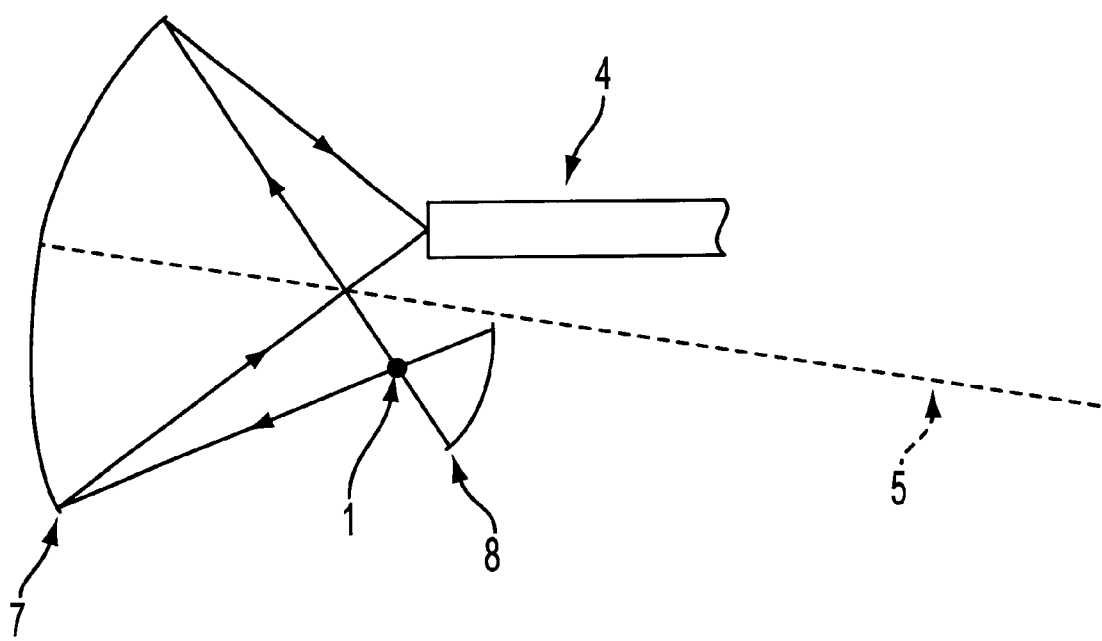
FIG. 3 is a schematic diagram of a prior art fiber optic illuminator having an off-axis toroidal reflector.

Both the configurations in FIGS. 1 and 2 have a common drawback in that the magnification of the system is greater than one and changes from one angle to another, thus reducing the brightness of the output focused spot. FIG. 3 depicts an off-axis system in which the light is imaged onto the output fiber optic 4 by the primary reflector 7.

As discussed in U.S. Pat. Nos. 4,757,431, and 5,430,634, the specifications of which are herein incorporated by reference, such an off-axis configuration produces a magnification of approximately 1:1 which is substantially constant over all angles, thus preserving the brightness of the original light from the lamp 1. Primary mirrors suitable for such an off-axis configuration can be of several known geometric shapes, including spherical, ellipsoidal, and toroidal. This configuration has provided systems with higher output than other systems with the same lamp 1. In this configuration, the output can be further increased by including the use of a retro-reflector 8 by which the light emitted at the opposite side of the primary mirror is reflected back into the direction of the output. Similar to the previous cases, the reflector can also be coated for specific applications.

Figure 4:
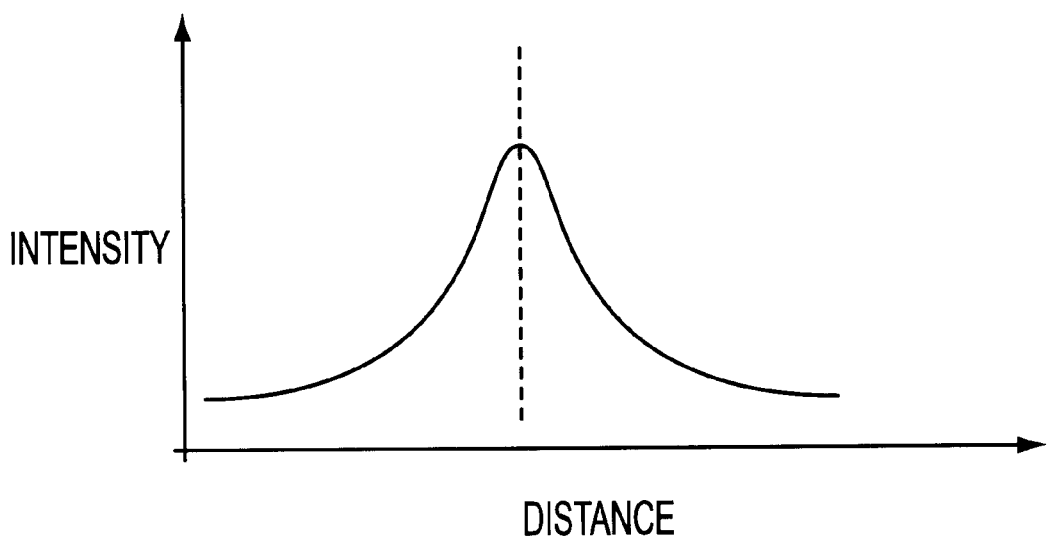
FIG. 4 is a graph of a typical intensity profile of the output light at the target spot of a illumination system showing a gaussian-like distribution.

FIG. 4 shows a typical intensity profile of the light image formed at the focal spot, the input end of the output fiber optic, in the systems depicted in FIGS. 1–3. It is usually circularly symmetric and "gaussian-like" in which the intensity at the center is higher than at the sides. Although the intensity at the center is high, due to the small area occupied, the total energy within this peak is relatively small and most of the energy is actually resided away from the center with lower intensity. Optical fibers are generally susceptible to heat damage at their input surface. The temperature at which such damage begins is related to the type of material which comprises the fiber. For example, for single optical plastic fibers, the typical operating temperature is less than 85° C. Due to the low thermal conductivity of the plastic, the high peak intensity of the focal spot creates localized heating at the center of the output fiber optic, thus damaging the fiber. For high output operation with these low melting point fibers, the present invention creates a uniform profile in the focused spot which provides maximum coupling of light into the fiber optic without the danger of localized heating. This improves coupling efficiency and prevents premature damage to the fiber optic.

Figure 5A:
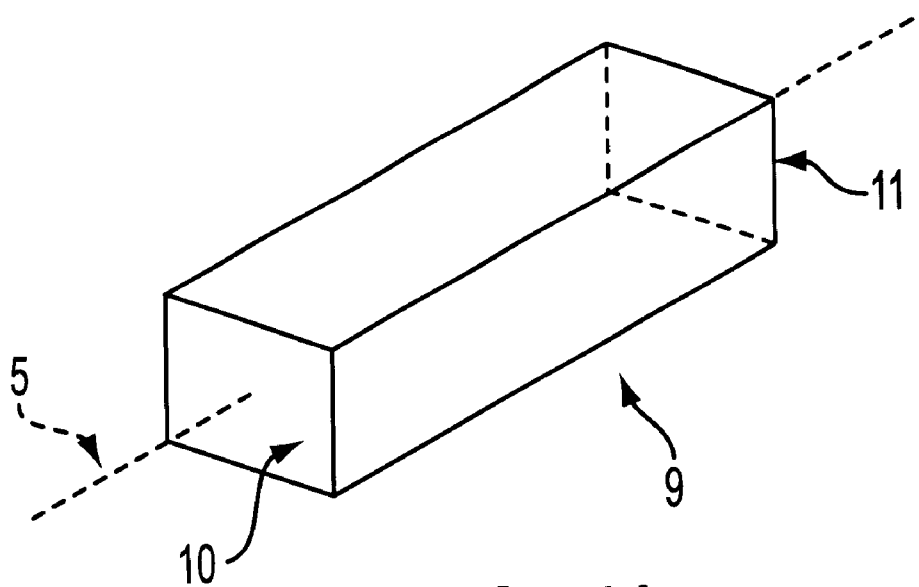
FIGS. 5a and 5b are schematic diagrams of homogenizers having square cross-sections as employed in embodiments of the present invention.
Figure 5B:
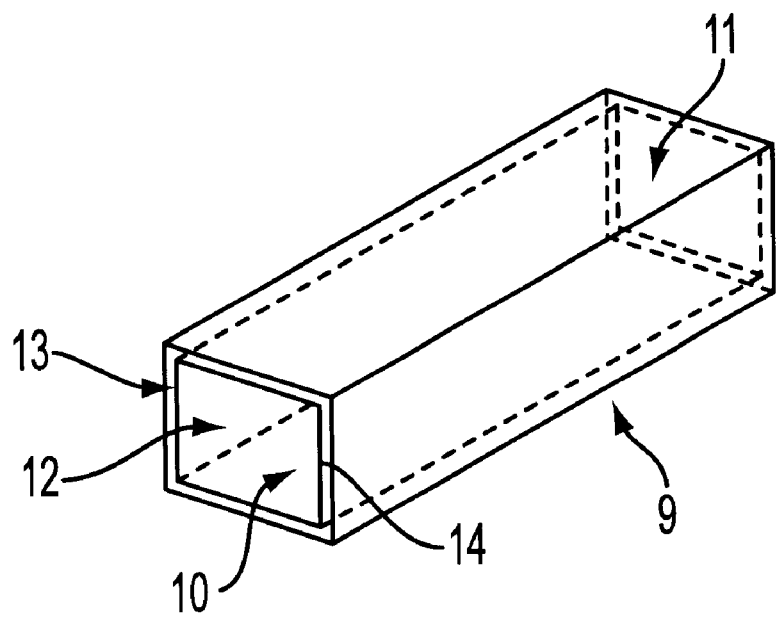

FIGS. 5a and 5b show embodiments of the present invention in which the homogenizer is a light conducting rod with a square cross-section. FIG. 5a shows a homogenizer, which is a rod 9 without cladding in which the total internal reflections occur at the glass to air interface. This rod can be made from quartz for high power applications. For lower power application, glass or plastic can be used. This rod consists an optical axis 5, an input surface 10 and an output surface 11, which are substantially perpendicular to the optical axis. The length is chosen such that the output intensity profile is substantially uniform. FIG. 5b shows a homogenizer, which is a rod 9 with both core 12 and cladding 13, as is common for a regular fiber optic, where the reflections will be at the core to cladding interface 14. Light entering at the input surface 10 will be guided along this square rod to the output surface 11 with multiple reflections at the interface 14. The net results of these multiple reflections will have an effect of mixing the light and changing its intensity profile, in this case, to a substantially uniform profile.

Figure 6:
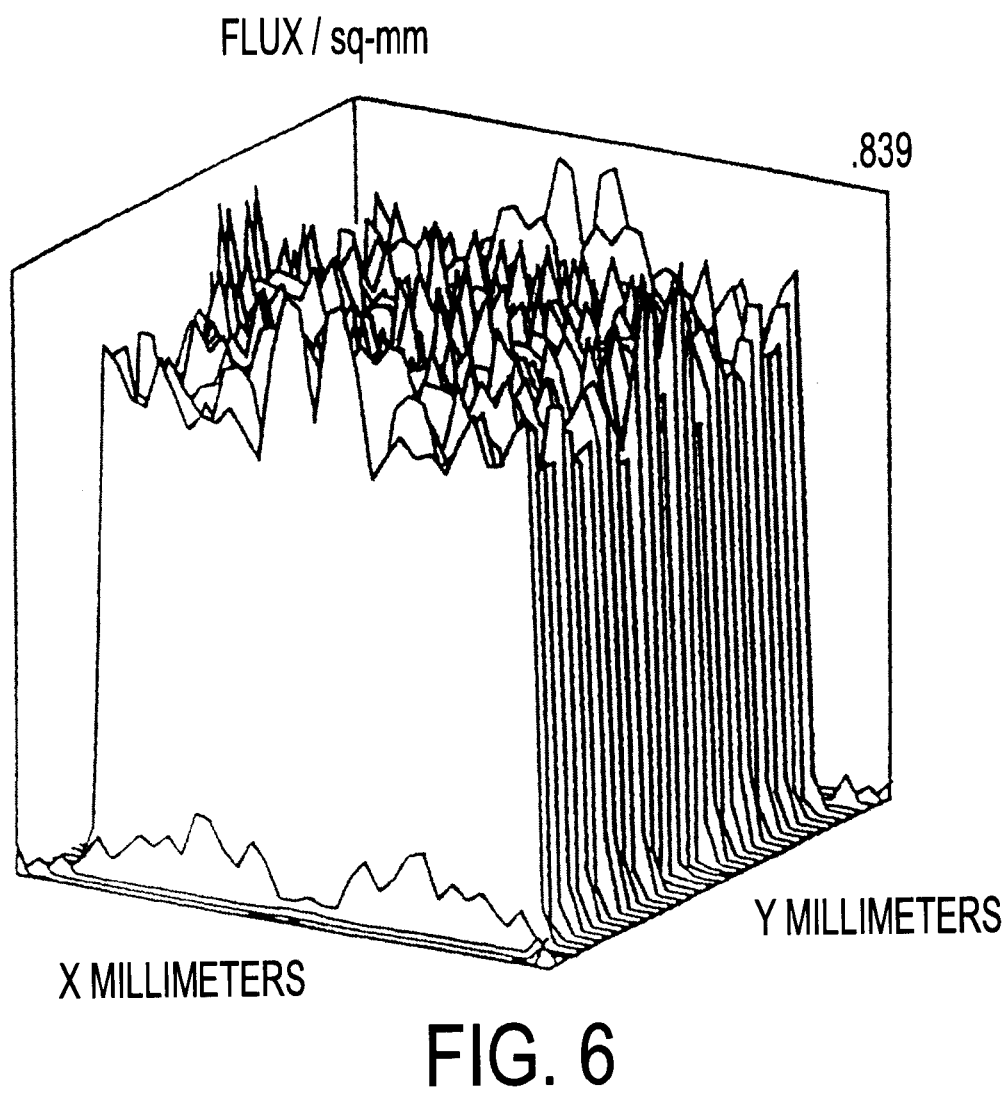
FIG. 6 graphically shows the plot of the intensity profile of the output light from a square homogenizer, such as the one depicted in FIG. 5, which plot shows that the output intensity profile is substantially uniform.
Figure 7:
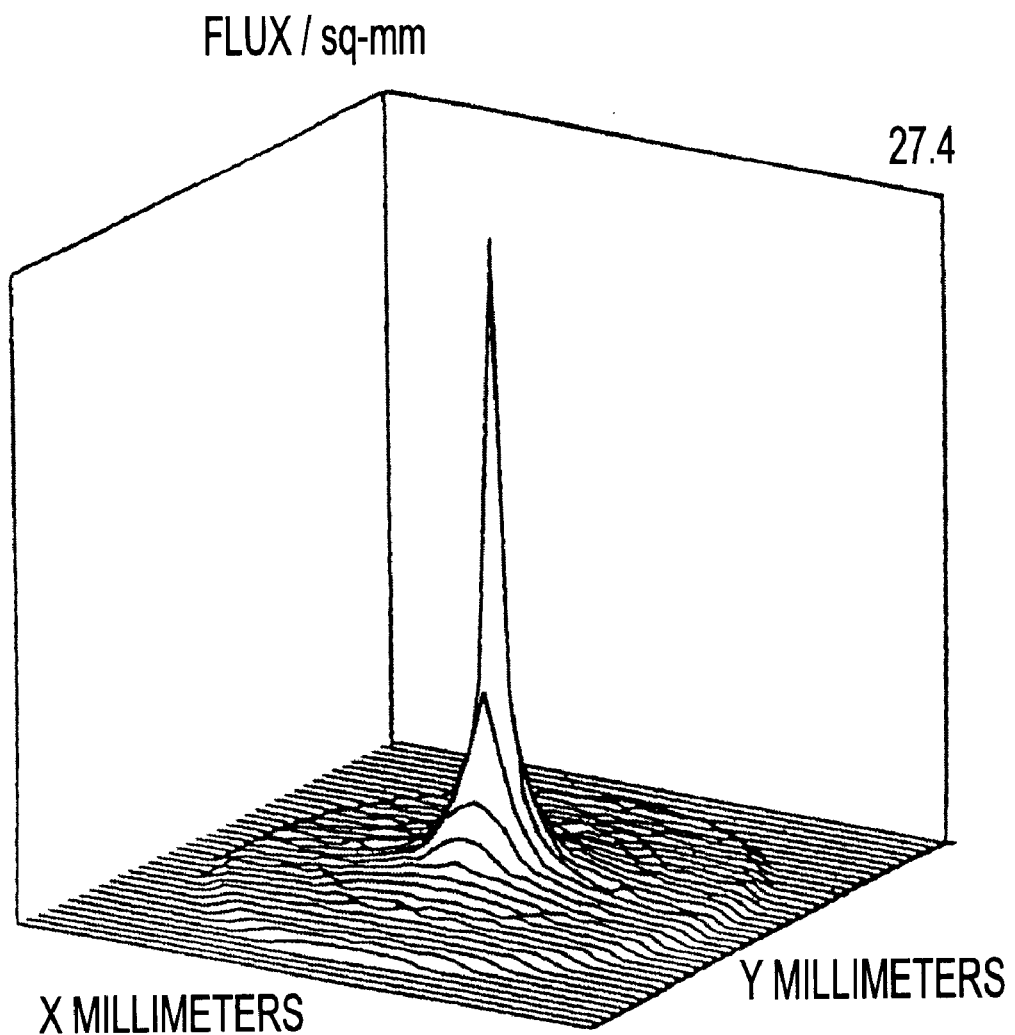
FIG. 7 graphically shows the plot of the intensity profile of the output light from a cylindrical homogenizer, which plot shows that the output intensity profile is peaked.
Figure 8A:
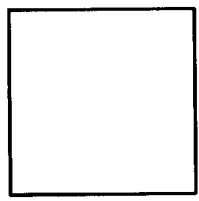
FIGS. 8a–8f are schematic diagrams of a variety of polygonal cross-sections which may be employed in embodiments of the present invention to provide uniform intensity profile outputs.
Figure 8B:
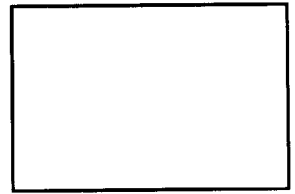
Figure 8C:
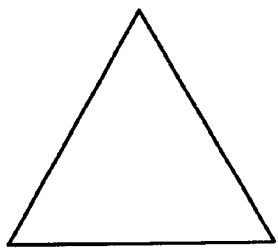
Figure 8D:
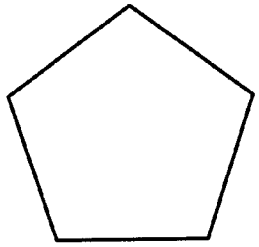
Figure 8E:
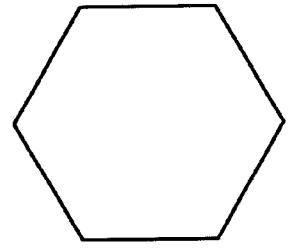
Figure 8F:
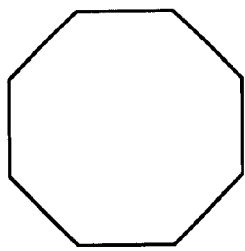

A computer simulation was performed on this square rod homogenizer using a point source at the input surface. For the simulation, the dimensions of the rod were a 4 mm×4 mm cross-section and 30 mm length. The intensity profile at the output surface was recorded. FIG. 6 shows the results of the simulation. As shown by the figure, the intensity profile is substantially uniform. In contrast, when a common rounded rod, having a 4 mm diameter and 30 mm length, was used in the simulation, a non-uniform output was produced. The output profile has a sharp peak at the center as shown in FIG. 7 (corresponding to FIG. 6). This comparison shows that a square rod is suitable for producing a uniform intensity profile while a round rod is not.

Experiments were performed using light output from a small fiber optic simulating a point source as the input to the homogenizer and the output intensity profiles were scanned. The results confirmed the computer simulations. FIG. 16 shows the experimental results, measuring the output power distribution of a 4 mm square by 5 mm square 35 mm length fused silica rod. Except for the results at the (4.4) corner, the distribution confirms the computer model. Corners can be distorted due to rounding during fabrication.

Further investigation has subsequently shown that various polygonal cross-sectioned shapes, including those depicted in FIGS. 8a–8f, can also be used for producing a uniform intensity profile. It will be apparent to one skilled in the art that the present invention is not limited to homogenizing waveguides having cross-sections as depicted in the figures. Countless polygonal cross-sections may be employed within the spirit of the invention, including ones having many sides and unequal length sides. For ease of manufacture and efficient coupling into output fiber optics, which typically are round, waveguides having cross-sections of regular polygons of up to ten sides are preferred.

Figure 9A:
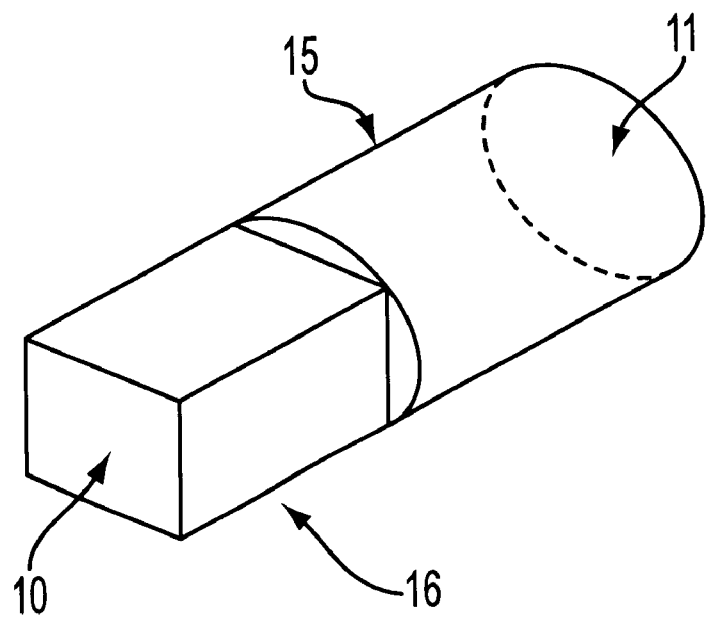
FIGS. 9a and 9b are schematic diagrams of a homogenizer of the present invention comprising an input end square rod and an output end round rod.
Figure 9B:
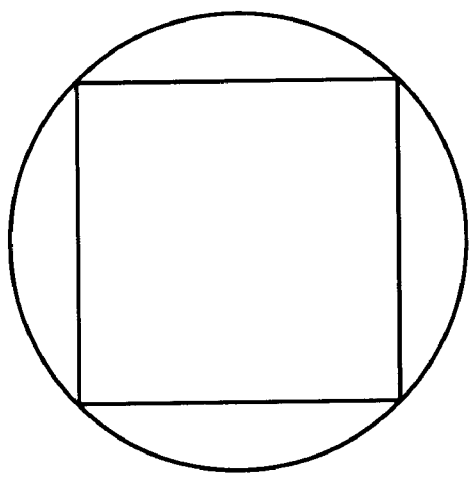

The maximum amount of light that can be coupled into an output fiber optic, from a substantially uniform intensity profile spot such as those produced by homogenizers of the present invention, will depend upon the damage threshold intensity of the fiber and whether the fiber's cross-sectional area closely matches that of the homogenizer's output. For coupling maximum amount of light into a round fiber optic, the full input surface should be fully utilized which requires the output of the light mixing optical element to approach a round object of the same diameter. This can be achieved in a variety of ways while staying within the spirit of the present invention. FIG. 9a shows an embodiment of the present invention comprising a homogenizer in which the input surface cross-section is square for proper light mixing. The output from the square rod 16, which has a uniform intensity profile, is coupled into a round rod 15, which further mixes the light from the square shaped input into a round shaped output. The area of the square fitted inside a circle, as must be done to ensure transmission of all light, is only 64% as shown in FIG. 9b.

A computer simulation was performed using a square rod having a 3 mm×3 mm cross-section and a length of 10 mm feeding into a round rod of diameter of 4.4 mm and a length of 10 mm. A computer simulation of the intensity profile at the square rod to round rod interface showed the intensity profile at the output of the round rod to be substantially uniform and fill the whole circular cross-section. Such a profile is particularly suitable to be used as the input to an output fiber optic because it substantially eliminates hot spots.

Figure 10:
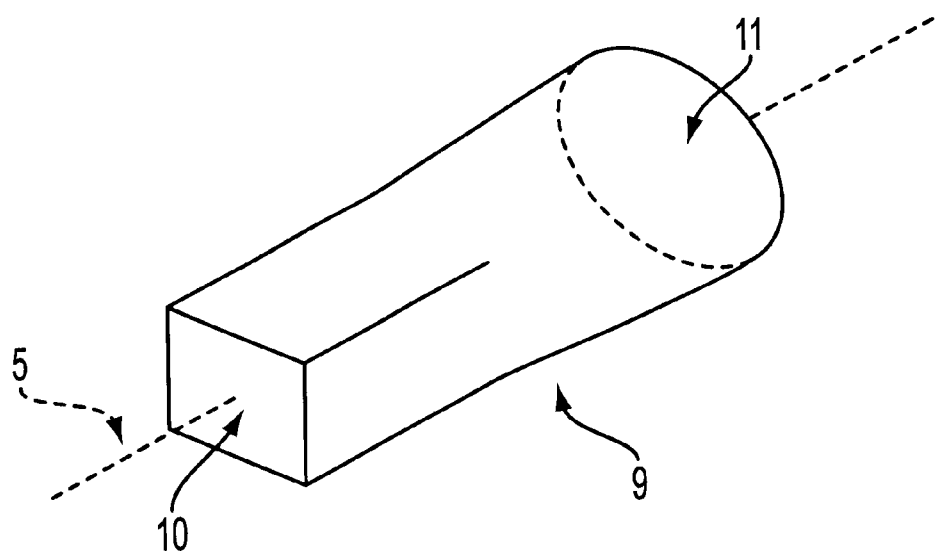
FIG. 10 is a schematic diagram of a homogenizer of the present invention having a square input end and round output end joined with a smooth transition.

Another embodiment of the present invention is shown in FIG. 10 in which a single optical element is comprised of a rod 9 having a smooth transition from a square cross-sectioned input surface 10 to a circular cross-sectioned output surface 11.

For applications where the numerical aperture of the output is desired to be different from the input, the homogenizer can be a tapered optical element. In addition, the square cross-sections can be transitioned, like the embodiment shown in FIG. 10, to elliptical, rectangular, or other polygonal cross-sections to alter the intensity profile of the focal spot, to match the output shape of the target, or to change the angular distribution of the transmitted light.

Figure 11:
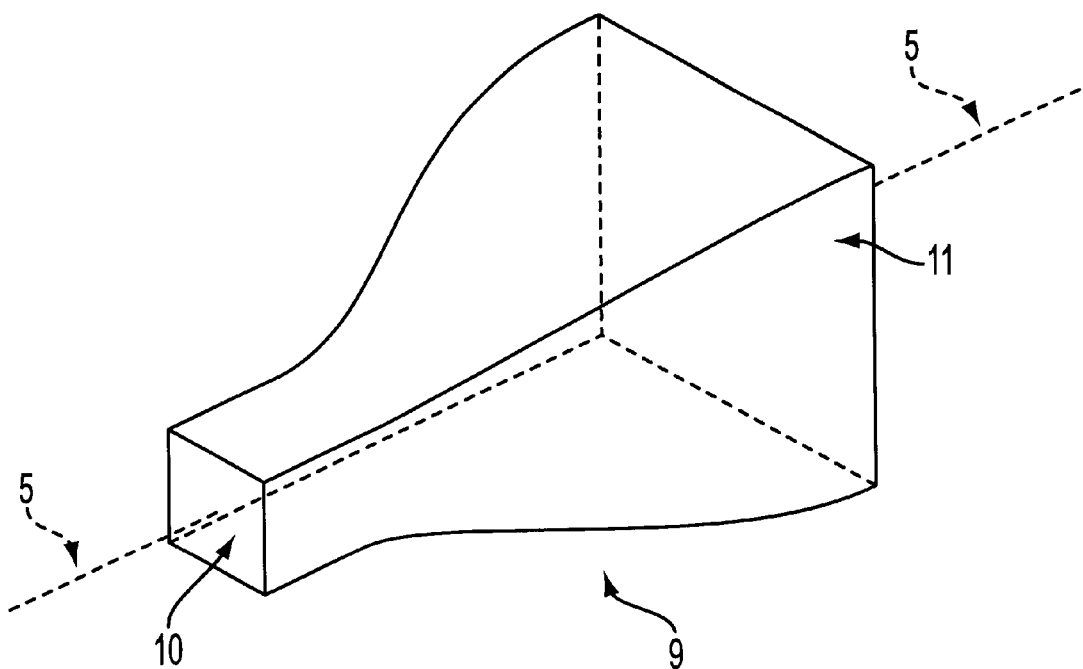
FIG. 11 is a schematic diagram of a square cross-section homogenizer of the present invention which tapers from a smaller entrance cross-section to a larger exit cross-section.
Figure 12:
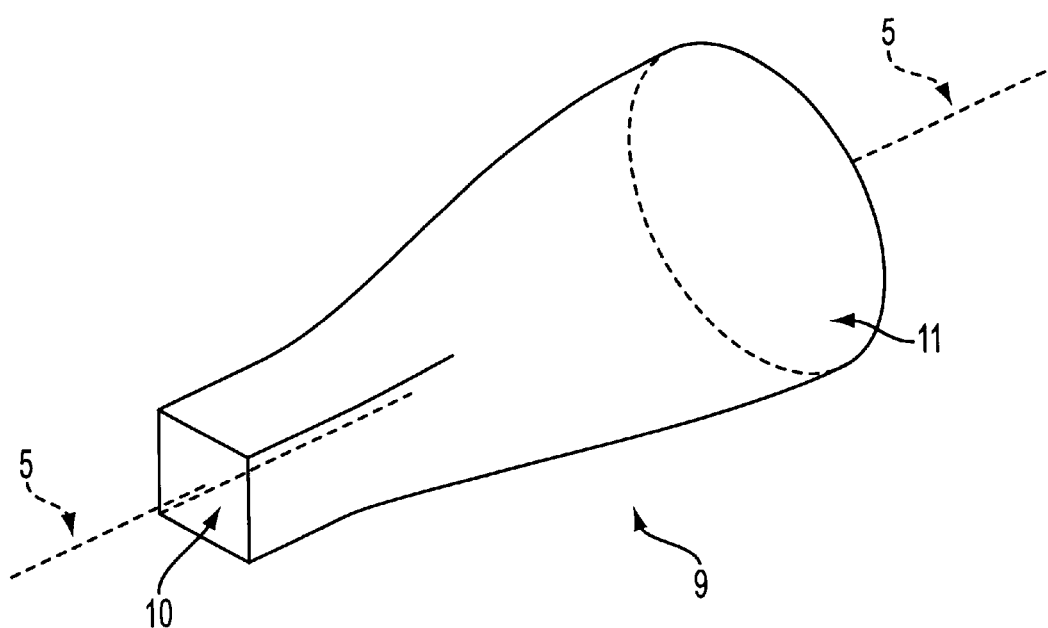
FIG. 12 is a schematic diagram of a homogenizer of the present invention having a square cross-section input which tapers to a round cross-section output having a substantially larger area.

FIG. 11 shows an embodiment in which the input cross-sectional area is rectangular and is smaller than the output cross-sectional area. In this case, the numerical aperture of the light exiting the output surface 11 is smaller than the numerical aperture of the light entering the input surface 10. FIG. 12 shows still another embodiment of the present invention having a rectangular cross-section input surface 10 and a larger circular cross-section output surface 11. Although both the illustrations above shows output cross-sectional areas larger than the input cross-sectional areas, the reverse can be used with larger input cross-sectional areas where appropriate for certain applications, such as for image projection systems.

Figure 13A:
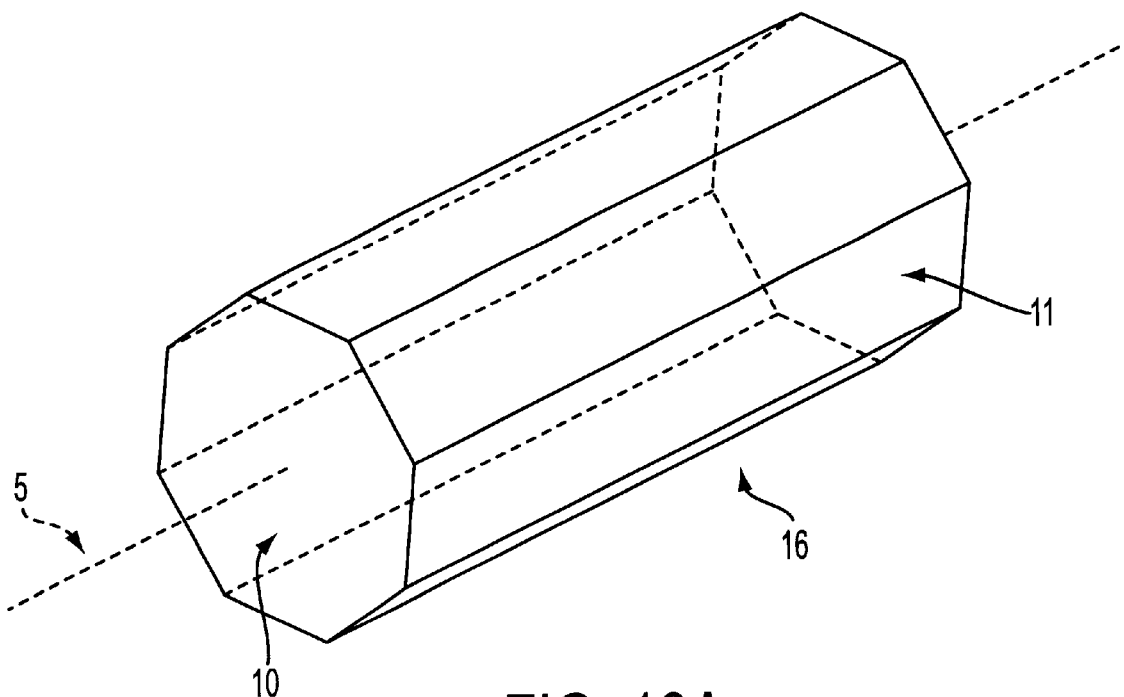
FIGS. 13a and 13b are schematic diagrams of an octagonal homogenizer used in embodiments of the present invention for matching to a round output fiber with high efficiency by approaching the cross-sectional area of the circular fiber with a circumscribed polygon.
Figure 13B:
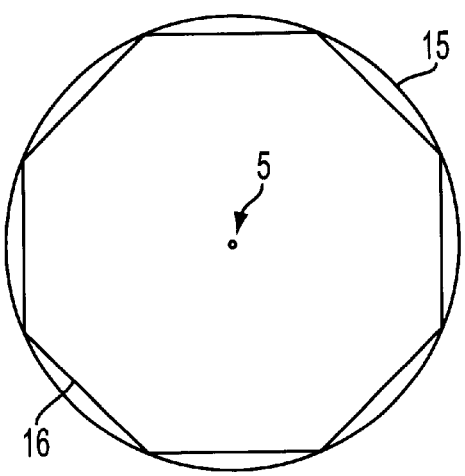

Although the homogenizers as shown in FIGS. 9 and 10 produce the desirable results, the method of making such configuration may be expensive. FIG. 13a shows an octagonal homogenizer in which it has substantially the same advantageous mixing properties as the other shapes. But when used with a circumscribing round output fiber optic 16, the overlap area depicted in FIG. 13b is 90% which would be sufficient in many areas of application.

Figure 14:
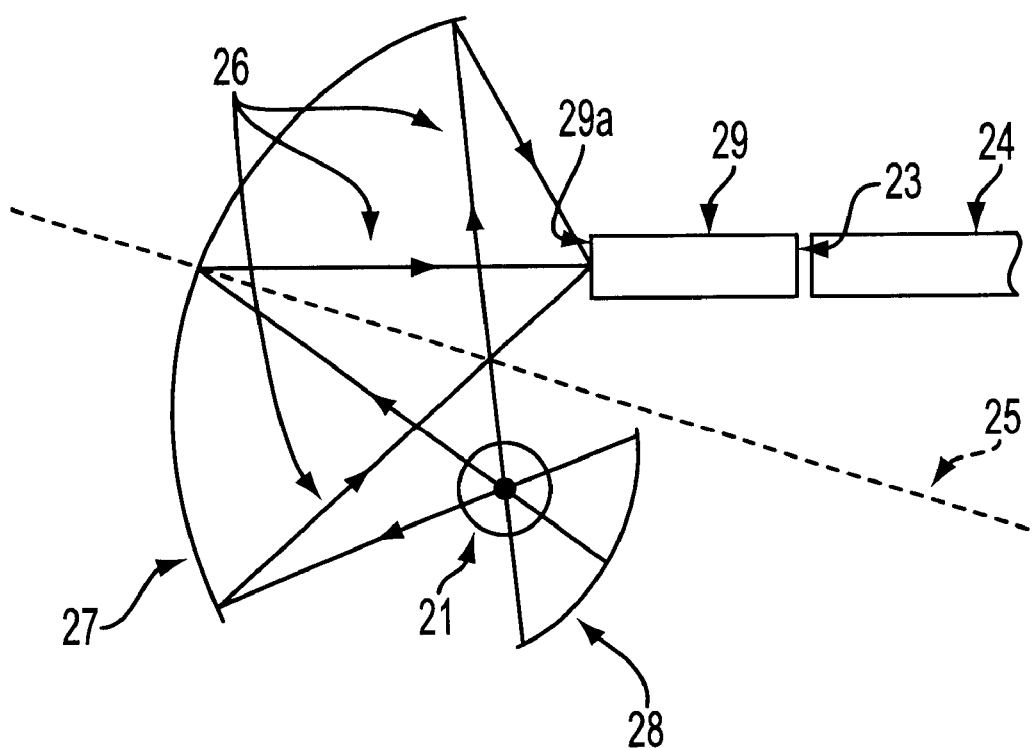
FIG. 14 is a schematic diagram of a fiber illumination system of the present invention having an offaxis configuration and a homogenizer comprised of a single waveguide.

FIG. 14 depicts another preferred embodiment of the invention. It consists of a lamp 21 aligned in an off-axis configuration with a toroidal concave mirror 27 as the primary reflector. Various lamp types can be employed, including metal halide, xenon, mercury, or mercury-xenon. Such an off-axis configuration is discussed in detail in U.S. Pat. No. 5,430,634 which has previously been incorporated by reference. For certain applications, a spherical concave or a ellipsoidal concave primary reflector 27 can alternatively be used. This concave reflector 27 can optionally be coated with a multi-layer dielectric film which reflects only the visible light and allows the UV and IR to pass through. Thus, only the visible radiation is focused onto the homogenizer input surface 29a. A retro-reflector 28 is used for increasing the output of the system by reflecting the light from the other side of the lamp back into the primary reflector 27. This configuration produces magnification of approximately 1:1 for all angles of light emission, thus preserving the brightness of the arc when imaged onto the homogenizer. The arc of the lamp 21 and its image from the retro-reflector 28 is focused, as demonstrated by the lights rays 26, onto the input surface 29a of the homogenizer 29, which is a tapered polygonal rod, such as a square rod.

By way of illustration, at the image point is placed a homogenizer 29 comprised of a tapered square rod, the input surface 29a having sides with length of 2 mm. In this case, the primary reflector 27 has a numerical aperture of 0.7, and a 350W metal halide lamp is used. The output fiber optic 24 is a fused bundle of optical fibers with diameter of 5 mm and an operating numerical aperture of 0.5. The square output surface 23 of the homogenizer 29 has sides with length of 3.5 mm and the total length of the tapered square rod from input to output is 35 mm. This taper ratio gives an output numerical aperture of approximately 0.41 which is slightly smaller than that of the fiber bundle, thus giving some margin for efficient coupling and lowering the propagation loss inside the fiber optic. However the length or input/output area ratio for the homogenizer can be varied to provide the optimum match in numerical aperture for any output fiber optic 24. In this case, the intensity of the output does not reach the damage threshold of the output fiber. As a result, coupling from the square output surface to the round input of the output fiber bundle 24 is not an issue.

Various alterations can be made to the above embodiment to tailor it to the specific needs of the system. For instance, the output fiber 24 can be any one of a single plastic fiber, a plastic fiber bundle, a glass fiber, or a glass fiber bundle. Similarly, depending on the power of the lamp 21, the homogenizer can be made of quartz for high power applications, or low temperature glass or even plastic for lower power applications, and either cladded or uncladded.

Figure 15:
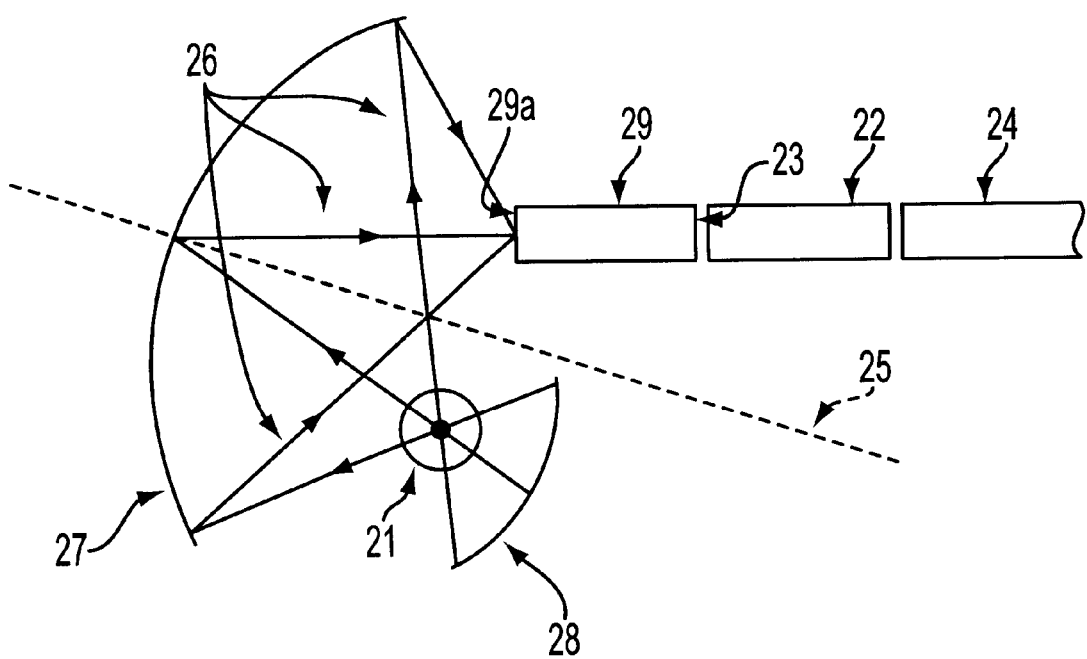
FIG. 15 is a schematic diagram of a fiber illumination system of the present invention having an offaxis configuration and a homogenizer comprised of a polygonal rod together with a round rod.

In another embodiment of the invention depicted in FIG. 15, when a lamp 21 having a higher power output is used, a round rod 22 can be inserted between the output surface 23 of the homogenizer 29 and the output fiber 24 to lower the intensity peaks by spreading the output from the square cross-section into the round cross-section. As shown in FIGS. 9c and 9d, this helps to more uniformly distribute the light intensity.

While it is illustrated and described in considerable detail herein, the invention is not to be limited to such details as have been set forth except as may be necessitated by the claims. The invention having been thus described, it will be apparent to those skilled in the art that the embodiments of the invention may be varied and modified in many ways without departing from the spirit and scope of the invention. Therefore, any and all such modifications are intended to be included within the scope of the following claims.

What is claimed is:

1. A method of transmitting light from a light source to increase the power handling capability of optical fibers, comprising the steps of:

emitting light having a light intensity profile which is non-uniform;

homogenizing said intensity profile to redistribute the light such that the profile is substantially uniform; and transmitting the redistributed light into at least one optical fiber.

2. The method according to claim 1, wherein the non-uniform intensity profile is gaussian-like.

3. The method according to claim 1, wherein the redistributing of said intensity profile is performed using an optical waveguide having an optical axis, and a polygonal cross-section at least partially along said optical axis.

4. The method according to claim 3, wherein said polygonal cross-section has up to ten sides.

5. The method according to claim 3, wherein said optical waveguide further comprises a substantially circular cross-section at least partially along said optical axis.

6. The method according to claim 3, wherein along the optical axis of said optical waveguide, the polygonal cross-section smoothly transitions to a substantially circular cross-section.

7. The method according to claim 3, wherein the waveguide has
- a length along the optical axis;
- a first and second surface, each surface placed at opposite ends of the length, and each having an area; and
- said first and second surfaces having different areas.

8. The method according to claim 7, wherein along the length of said optical waveguide, the polygonal cross-section smoothly transitions to a substantially circular cross-section, and the area of the first surface smoothly transitions to the area of the second surface.

9. The method according to claim 1, wherein said step of emitting light includes condensing light from a point source.

10. The method of claim 1, wherein said homogenizing is carried out by a waveguide, said waveguide comprising:
- a homogenizer for mixing said light intensity profile received at an input end of the waveguide; and
- at least one optical fiber which is temperature sensitive, connected proximate to an output of said homogenizer; and
- wherein said transmitting further comprises transmitting light from said light source through said waveguide so as to produce the substantially uniform profile for introduction into said at least one optical fiber, wherein said at least one optical fiber is not damaged by said light.

11. The method according to claim 10, wherein said light source provides light having a substantially non-uniform intensity profile.

12. The method according to claim 11, wherein the non-uniform intensity profile is gaussian-like.

13. The method according to claim 10, wherein the waveguide has an optical axis, and a polygonal cross-section at least partially along said optical axis.

14. The method according to claim 13, wherein said polygonal cross-section has up to ten sides.

15. The method according to claim 13, wherein said optical waveguide further comprises a substantially circular cross-section at least partially along said optical axis.

16. The method according to claim 13, wherein along the optical axis of said optical waveguide, the polygonal cross-section smoothly transitions to a substantially circular cross-section.

17. The method according to claim 13, wherein the waveguide has
- a length along the optical axis;
- a first and second surface, each surface placed at opposite ends of the length, and each having an area; and
- said first and second surfaces having different areas.

18. The method according to claim 17, wherein along the length of said optical waveguide, the polygonal cross-section smoothly transitions to a substantially circular cross-section, and the area of the first surface smoothly transitions to the area of the second surface.

19. The method according to claim 13, wherein said step of emitting light includes condensing light from a point source.

20. A fiber optic illumination system for carrying out the method of claim 1, comprising:
- a light source;
- a waveguide having an input end, an output end, and an optical axis, said input end being placed in proximity to said light source such that a substantial amount of light is coupled into the waveguide, travels along the optical axis, and exits through the output end, said exiting light having a substantially uniform intensity profile at the output end, and wherein said waveguide has a polygonal cross-section at least partially along said optical axis;
- at least one output fiber optic placed proximate to said output end such that the light exiting from said output end is coupled into said at least one output fiber optic with high efficiency.

21. The fiber optic illumination system according to claim 20, wherein said waveguide is comprised of materials selected from the group consisting of quartz, glass and plastic.

22. The fiber optic illumination system according to claim 20, wherein said polygonal cross-section is regular, and is comprised of up to 10 sides.

23. A fiber optic homogenizer for carrying out the method of claim 1, comprising:
- a first waveguide having a first input end corresponding to a first input area, a first output end corresponding to a first output area, and a first optical axis having a cross-sectional shape substantially of a polygon, and wherein said first input end and said first output end are substantially perpendicular to said first optical axis;
- a second waveguide having a second input end corresponding to a second input area, a second output end corresponding to a second output area, and a second optical axis having a cross-sectional shape substantially of a circle, and wherein said second optical axis is substantially collinear to said first optical axis, and said second input end of said second waveguide is placed in close proximity to the first output end of said first waveguide.

24. The fiber optic homogenizer of claim 23, wherein said first output area of said first waveguide is completely contained within said second input area of said second waveguide.

25. The fiber optic homogenizer of claim 23, wherein said first input area is equal to said first output area.

26. The fiber optic homogenizer of claim 23, wherein said second input area is equal to said second output area.

27. The fiber optic homogenizer of claim 23, wherein said first input area is smaller than said first output area.

28. The fiber optic homogenizer of claim 23, wherein said first input area is larger than said first output area.

29. The fiber optic homogenizer of claim 23, wherein said second input area is smaller than said second output area.

30. The fiber optic homogenizer of claim 23, wherein said second input area is larger than said second output area.

31. The fiber optic homogenizer of claim 23, wherein said first output end of said first waveguide and said second input end of said second waveguide are physically joined together with a smooth transition so as to form a unitary waveguide.

32. The fiber optic homogenizer of claim 23, wherein said first waveguide has a cross-sectional shape substantially of a regular polygon comprising up to ten sides.

33. A fiber optic illumination system for carrying out the method of claim 1, comprising:
- an arc lamp;
- a primary reflector for collecting and focusing light collected from said arc lamp to a focus;

a polygonal rod with a first input end and a first output end, said polygonal rod placed with the input end coincident with said focus so as to receive an optimal amount of light collected by said primary reflector, an output fiber optic with a second input end and a second output end, said second input end coupled to said first output end of said polygonal rod such that substantially all the light exiting the polygonal rod's first ouput end is coupled into said ouput fiber.

34. The fiber optic illumination system of claim 33, wherein said primary reflector is comprised of a reflector selected from the group consisting of a spherical reflector, an ellipsoidal reflector, and a toroidal reflector.

35. The fiber optic illumination system of claim 33, wherein the polygonal rod is comprised of a material selected from the group consisting of quartz, glass, and plastic.

36. The fiber optic illumination system of claim 33, wherein the ouput fiber optic is selected from the group consisting of a plastic fiber, a bundle of plastic fibers, a single glass fiber, and a glass fiber bundle.

37. The fiber optic illumination system of claim 33, wherein the polygonal rod is tapered.

38. The fiber optic illumination system of claim 33, wherein the polygonal rod has a square cross-section, said first input end having a cross-section with a side length of about 2 mm, said first output end having a cross-section with a side length of about 3.5 mm, and wherein said polygonal rod has an axial length extending from said first input end to said first output end, and said axial length is about 35 mm.

39. The fiber optic illumination system of claim 33, further comprising a round rod having a third input end and a third ouput end, said round rod placed between said first output end of said polygonal rod and said second input end of said output fiber optic such that light is coupled from said first output end of said polygonal rod and into said third input end of said round rod, and such that light is coupled from said third output end of said round rod and into said second input end of said output fiber optic.

* * * * *